United States Patent Office 2,757,976
Patented Aug. 7, 1956

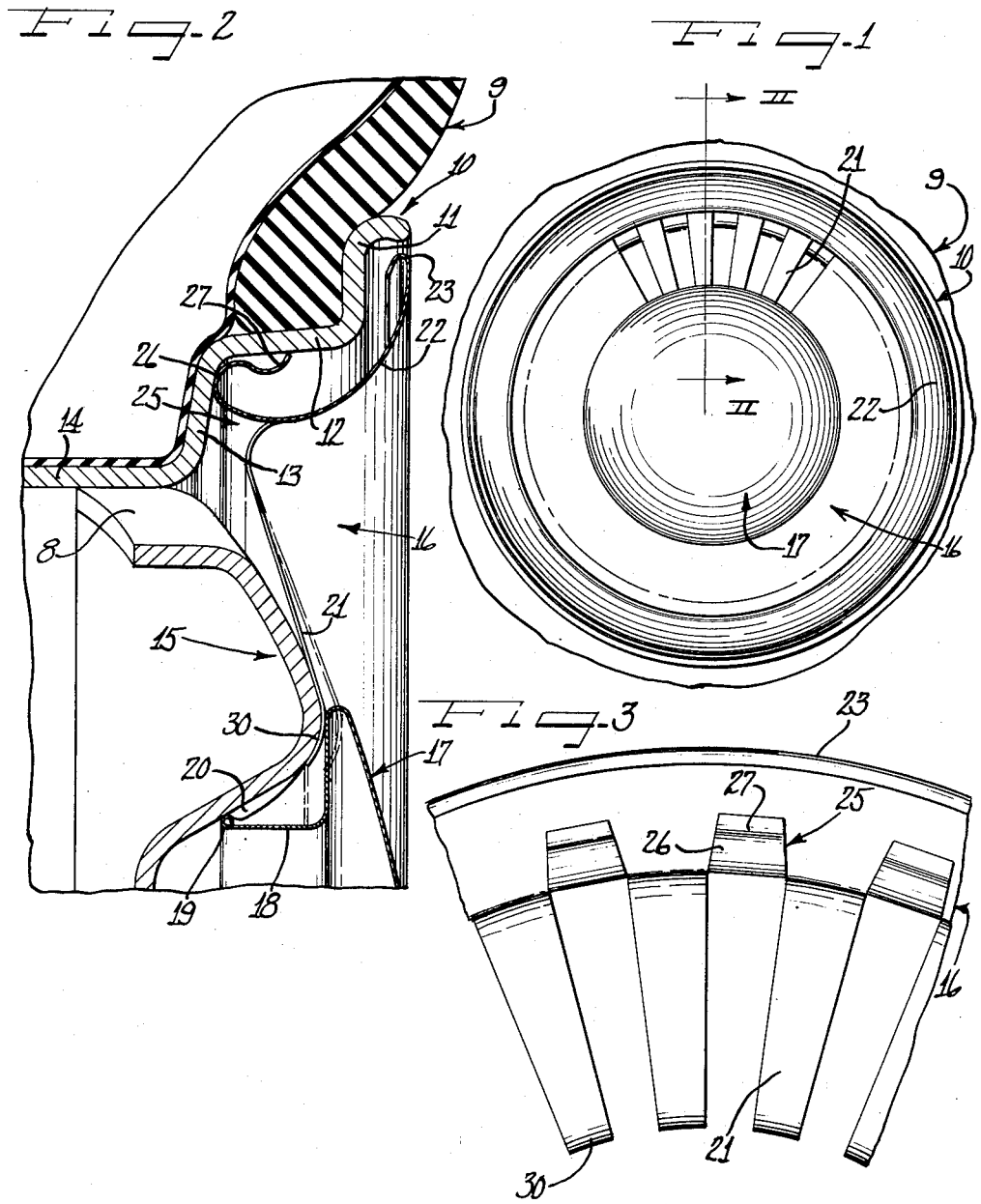

2,757,976

WHEEL COVER

George Albert Lyon, Detroit, Mich.

Application October 12, 1953, Serial No. 385,471

1 Claim. (Cl. 301—37)

This invention relates to a wheel cover and more particularly to a spoked wheel cover for automobile wheels.

An object of this invention is to provide a wheel cover with alternating spokes and retaining fingers which lends itself to economical manufacture on a large production scale.

Another object of this invention is to provide a wheel cover with cover retaining fingers cooperable with a rim flange of the cover and also with resilient spokes clampingly cooperable with the body part of the cover.

In accordance with the general features of this invention there is provided in a cover structure for a wheel, a circular cover member having depressed axially rearwardly turned angular cover retaining fingers leaving generally radially extending openings in the cover and a plurality of spoke-like portions extending radially inwardly from the fingers.

Other objects and features of this invention may more fully appear from the following detailed description taken in connection with the accompanying drawings which illustrate several embodiments thereof and in which—

Figure 1 is a fragmentary side view of a wheel structure having applied thereto one form of the cover of this invention;

Figure 2 is an enlarged fragmentary cross-sectional view taken on substantially the line II—II of Figure 1 looking in the direction indicated by the arrows and showing by dotted lines the normal position of the spoke portions of the cover prior to deflection of the same into clamped engagement with the wheel body; and Figure 3 is a fragmentary rear view of the cover shown in Figure 2.

In the drawing there is shown a conventional type of automobile tire and wheel assembly including a conventional pneumatic tire and tube assembly 9 mounted in the customary way upon a multi-flanged drop-center type of tire rim 10. This rim 10 includes terminal, generally axial, generally radial, and base flanges 11, 12, 13 and 14. These step flanges are, of course, well known in the automobile art as such rims are, at present, widely used throughout the automobile industry.

The tire rim 10 is carried in the customary way upon a load bearing or supporting body member 15 having the usual air circulating wheel openings 8. This body part, as shall be more fully described hereinafter, carries a conventional detachable central hub cap 17.

Cooperable with this standard type of wheel assembly is a cover embodying this invention designated generally by the reference character 16. It is preferably made from a sheet metal stamping and includes, as components thereof, both retaining means and spokes. This cover 16 is adapted to be clamped to the wheel body 15 by the hub cap 17 which is of a conventional construction. The hub cap 17 includes an underturned annular skirt 18 terminating in a continuous resilient edge 19 adapted to be snapped over spaced bumps or protuberances 20 of the central part of body portion 15. Such a form of hub cap is shown in numerous previous patents and is now conventional in the automobile industry.

The cover 16 includes a plurality of radially extending spoke portions 21 terminating in an outer convexly curved annular portion 22 having a turned outer pry-off edge 23 spaced from the terminal flange 11. It will be observed that the radially and axially inner portion of the annular cover portion 22 is disposed generally telescopically within the axially extending intermediate flange 12 of the tire rim but in radially inwardly spaced relation thereto.

The resilient radial spokes 21 alternate with rearwardly extending cover retaining fingers 25, each of which is, in reality, formed from material taken and pressed from between the spokes in the fabrication of the spokes.

The cover retaining fingers 25 may be of any suitable number consistent with the number of spokes desired and inasmuch as they are identical, a description of one will suffice for all. Each finger is of generally U-shape and extends axially inwardly or rearwardly from the outer curved portion 22 and includes return bent loop providing a generally radially outwardly and then axially outwardly bent finger leg portion 26 adapted to bottom against radial rim flange 13 and then projecting into the space between the cover portion 22 and the intermediate flange 12 and being radially spaced from both and radially resiliently deflectable. At its axially outer extremity, the finger portion 26 has a short and stiff portion providing an angular inclined extremity 27. This extremity 27 extends generally axially and radially outwardly in an inclined manner to an edge for gripping and cover retaining engagement with the surface of the axial rim flanges 12.

It is to be appreciated that the edges of the finger extremities 27 are disposed in a common circle of a diameter slightly greater than that of the inside surface of rim flange 12 so as to require resilient flexure of the fingers when they are cammingly engaged with rim flange 12.

As noted before, each of the radial spoke portions 21 is resilient and terminates inwardly in a turned extremity 30 adapted to bottom on and be clamped against the wheel body part 15 by the peripheral margin of the hub cap 17 as shown in Figure 2. Normally, the spokes are disposed in the dotted line position shown in Figure 2 and upon being clamped to the wheel are deflected to the full line position by the engagement with the hub cap therewith. Inherently the resilient tension thus imposed on the inner margin of the annular portion 22 is reflected in the retaining fingers 25, the gripping of which against the tire rim is thereby enhanced.

From the foregoing, it is clear that I have provided a cover wherein it is not only retained on the wheel by the resilient fingers 25 but, in addition, is resiliently clamped to the wheel by engagement of the hub cap with the cover spoke portions 21. This engagement insures a tight and positive retention of the cover on the wheel.

Moreover, the foregoing structure provides a highly ornamental cover wherein the radial spoke portions 21, in addition to ornamenting the cover, serve to define openings between them through which air can circulate into the body of the wheel and through openings 8.

The cover is applied to the wheel by first placing it over the wheel with its fingers aligned with the rim flange and by thereafter pressing the cover into the wheel so that the fingers are resiliently stressed as they are cammed along the inclined surface of the rim flange. Thereafter, the hub cap is applied over the inner ends of the spokes to resiliently stress and clamp the same to the body part as the cap is snapped into retaining engagement with the wheel bumps 20.

Removal of the cover member 16 is easily effected by first prying off the hub cap and by thereafter inserting a pry-off tool under the outer edge of the cover and by forcibly ejecting it from the wheel.

It should be noted that when the cover assembly 16, 17 is on the wheel it, in effect, provides a single cover of which the members 16 and 17 are respectively radially outer and radially inner portions of the cover with the spokes 21 connecting the same and with the retaining fingers 25 not only serving to retain the radially outer cover portion 16 in its axial relation to the wheel, but also holding the same centered with respect to the wheel.

I claim as my invention:

In a wheel structure including a tire rim having a side flange facing generally axially outwardly and an intermediate flange projecting generally axially and radially outwardly therefrom and facing radially inwardly, a trim ring for disposition at the outer side of the wheel including a body for overlying the tire rim and extending generally axially inwardly into substantially concentric radially inwardly spaced relation from said intermediate flange and being at its radially and axially inner edge subdivided into a circumferentially spaced series of resilient retaining fingers and generally radially inwardly extending spokes, with both the spokes and the fingers derived integrally from a common piece of material with the trim ring body, said retaining finger being of generally U-shape with axially inwardly extending portions and return bent respective loops providing generally radially outwardly and then axially outwardly extending finger legs projecting into the space between said trim ring body and the intermediate flange and being radially spaced from both and radially resiliently deflectable, said legs having short and stiff radially and axially outwardly angled retaining terminals engageable at their tips in retaining gripping press-on pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said finger loops being engageable with the side flange of the tire rim for defining the axially inward disposition of the trim ring with said spokes projecting generally radially inwardly beyond the tire rim for overlying a wheel body attached to the tire rim.

References Cited in the file of this patent
UNITED STATES PATENTS

| | | |
|---|---|---|
| D. 167,271 | McLeod | July 15, 1952 |
| 2,368,238 | Lyon | Jan. 30, 1945 |
| 2,422,690 | Lyon | June 24, 1947 |
| 2,504,995 | Lyon | Apr. 25, 1950 |